March 12, 1946. B. C. HARRIS 2,396,506
MOTOR VEHICLE
Filed July 14, 1944 3 Sheets-Sheet 1

INVENTOR.
BERT C. HARRIS
BY
ATTORNEYS

March 12, 1946. B. C. HARRIS 2,396,506
MOTOR VEHICLE
Filed July 14, 1944 3 Sheets-Sheet 2

INVENTOR.
BERT C. HARRIS
BY
ATTORNEYS

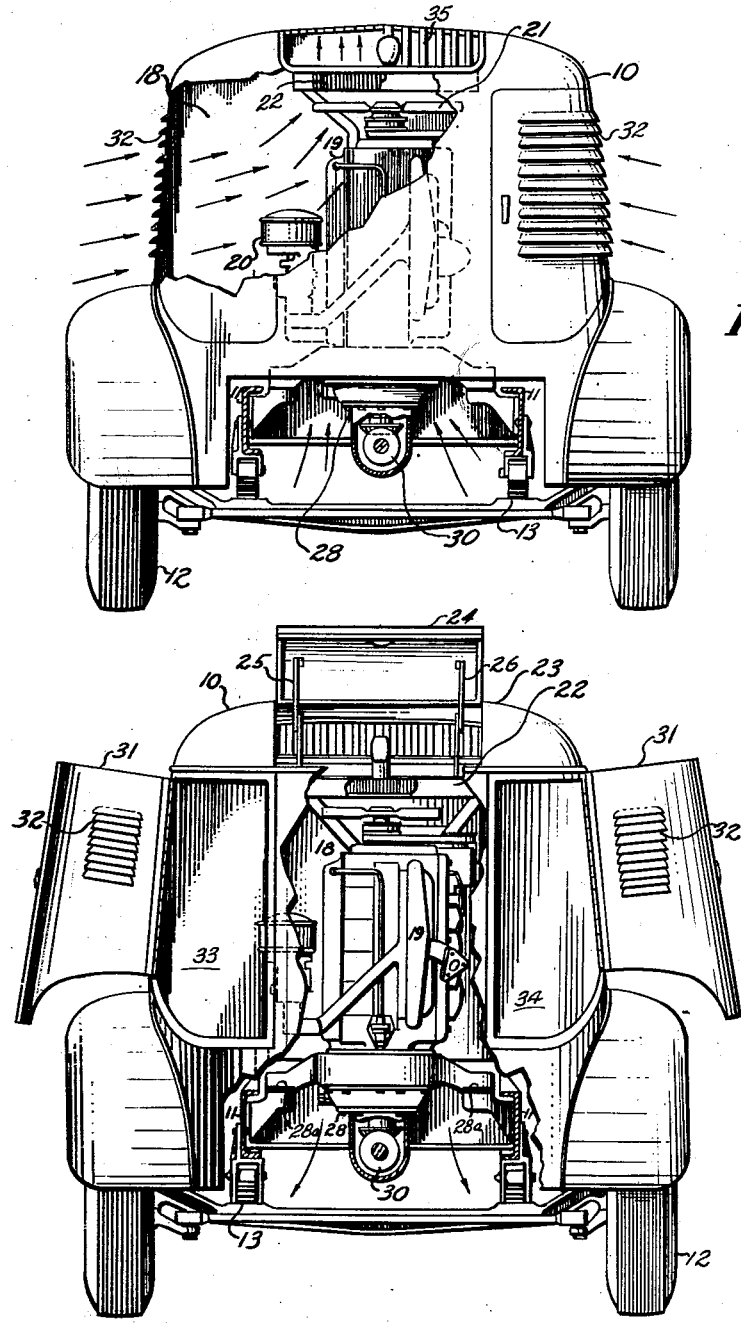

Patented Mar. 12, 1946

2,396,506

UNITED STATES PATENT OFFICE 2,396,506

MOTOR VEHICLE

Bert C. Harris, Shaker Heights, Ohio, assignor to The White Motor Company, Cleveland, Ohio, a corporation of Ohio Application July 14, 1944, Serial No. 544,904

7 Claims. (Cl. 180—89)

This invention relates broadly to motor vehicles and more specifically to improvements in the construction and arrangement of the cab and power plant therefor.

The truck transportation industry has been moving along in slow evolutionary lines up to the present day. Being a commercial enterprise, this is only natural as the truck is a tool in the hands of an operator from which he expects a monetary return, hence any radical departure from a known and proved design has been scrutinized with such skepticism as to deter the manufacturers of trucks from venturing more than most rudimentary improvements.

In the early days of the twentieth century time was not of the essence and the trade expected little more than that a truck be able to carry a certain load. The prime consideration of the manufacturers on the other hand was to produce a truck which would load from one point to another, with a certain degree of reliability. As the horse power of engines increased and the vehicular suspension improved to accommodate greater loads, operators began to realize the opportunity of moving freight and commodities by the truck on a satisfactory financial basis. Some operators, however, became over-zealous in their desire to move great loads by a single vehicle and demanded longer wheel bases to accommodate such loads with the attendant result that driving on streets and highways constructed primarily for passenger car use or horse and wagon drayage became hazardous from the standpoint of safety and caused a general breakdown in the roads. Therefore, legislature of the various states throughout the entire nation passed enactments which limited vehicles to a definite overall length and gross weight.

In the face of such legislation, it became necessary for the truck manufacturers to produce a vehicle which would come under the regulations of the states and yet give the operator a maximum efficiency in the conduct of his business. At this time, payload space became one of the most important elements of commercial truck and truck-tractor design. Thus we saw the beginning of the vehicles with cabs mounted on the forward end of the chassis in close coupled relation with the engine. By mounting the cab over the engine, at the forward end of the chassis still greater payload space was obtained. Such construction prevails today and is commonly known as "cab over engine" model. By this time, large fleet owners were conducting business on a large scale nation-wide basis. It was, therefore, incumbent that they maintain their trucks to the highest efficient operating conditions at all times. The cab-over-engine model has proved to entail more time to maintain than the conventional type of truck, inasmuch as a great deal of work is necessary in removing the cab or panels in order to gain accessibility to the engine in making the necessary adjustments and repairs. Therefore, a further step in the advance of the art was made with the advent of the tilting cab invented by Spear, Patent No. 2,148,308, and Spear, Patent No. 2,306,348. By means of the tilting cab, the operator could rock the body structure forwardly away from the engine and have perfect access thereto for the purpose of repair or major adjustment to the power and accessory units.

The present invention is directed to a still further advance in the art of commercial automotive trucks and contemplates the combined advantage of increased payload space and engine accessibility.

In terms of structure the invention utilizes a cab mounted on the forward end of a low drop frame chassis constructed in such a fashion that an engine may be mounted immediately behind the driving compartment, and preferably enclosed in a common shell and roof assembly. The tilting cab, although a definite improvement over the standard cab-over-engine design, has been found costly to manufacture and often objectionable with respect to weight. These objections have been overcome in the present invention, of which an object is to provide a vehicle cab which includes a driving compartment, an engine compartment under a common roof, and within a single unitary sheet metal structure.

Another object of the invention resides in the provision of a design in which a single cab, including a driver's compartment and an engine compartment, is mounted on the forward end of a low drop frame of the vehicle chassis in such a manner as to permit easy ingress to and egress from the cab and at the same time provide ready accessibility to the engine and its accessories.

Another object of the invention is to provide a cab mounted on the forward end of a vehicle which has an engine compartment tandem with respect to the driving compartment and which eliminates the cab floor obstruction or so called doghouse within the driver's compartment occasioned by the protuberance of the engine and accessories therefor as found in a truck of the customary cab-over-engine design.

Another object of the present invention is to provide a vehicle cab which may be standardized in production to accommodate all sizes and models of trucks and have complete interchangeability of parts throughout the wide range of models.

Another object of the invention is to provide a novel vehicle structure including a driver's compartment and engine compartment wherein engines of various size may be interchanged within the engine compartment.

Another object of the invention is to provide a unique vehicle cab structure which may be used as a cab for a truck-tractor or as a cab for a conventional type truck.

A still further object of the invention is to provide a vehicle cab which combines the inherent advantages of a conventional truck and a cab-over-engine without their attendant disadvantages enumerated above.

Another object of the invention is to provide a novel type of vehicle cab which will increase safety of operation through the improved visibility afforded the driver.

A still further advantage of the invention resides in the provision of a flat ceiling of uniform height within the cab and the further provision of a dome-type roof in spaced relation therewith.

Other objects and advantages more or less ancillary to the foregoing and the manner in which all the various objects are realized, will appear in the following description, which when considered in connection with the accompanying drawings sets forth the preferred embodiment of the invention.

Referring to the drawings.

Fig. 5 is a rear elevation of a modified form of the cab, the frame being shown in section and a portion of the rear panels being broken away to illustrate the position of the engine within the rear compartment; the arrows in this figure indicate the direction of an alternate form of an air circulatory system; and Fig. 6 is a rear elevation of the vehicle cab with the doors open and a portion of the rear panel and frame broken away to illustrate the position of the engine and associated accessories therefor; the arrows in this figure indicate the direction of flow of the discharged air from the engine compartment.

Figure 1:
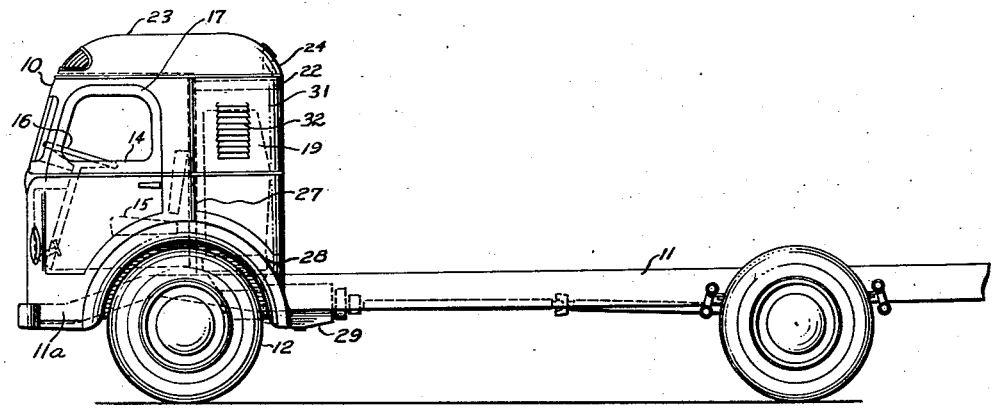
Fig. 1 is a side elevational view of a commercial vehicle chassis including a cab embodying the present invention.
Figure 2:
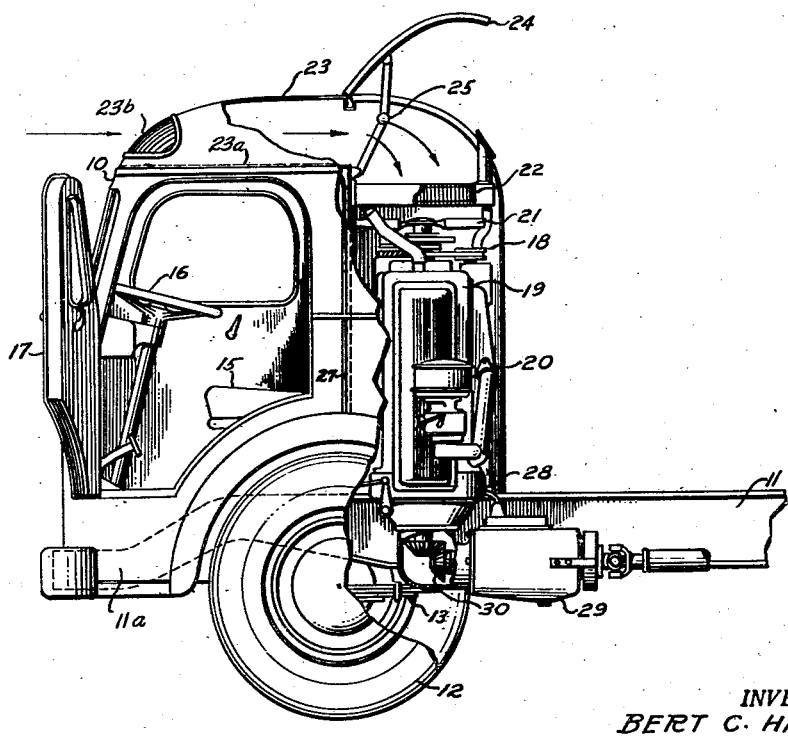
Fig. 2 is a side elevation of the forward portion of the vehicle shown in Fig. 1, with the cab door open and the walls defining the engine compartment broken away in the interests of clarity. The arrows shown herein indicate one form of an air circulatory system afforded by the structure.

Referring first to Fig. 1, the vehicle cab 10 is mounted on a frame 11, supported on wheels 12 by axle and spring assembly 13. The cab is mounted on the forward end of the frame, the floor of the cab being disposed in contiguous relation with a dropped front end section 11—a of the frame. The vehicle cab 10 is divided into two sections, namely, a driver's compartment 14 including seat 15, steering gear 16, and door 17, and an engine compartment 18 including an engine 19, and the accessories therefor, such as the air cleaner 20, generator, distributor, oil filter, fan 21, and radiator 22, illustrated in Figs. 2, 5 and 6. The top of the cab is formed with a crowned roof 23 having a horizontal wall 23—a disposed in spaced relation therewith in the driving compartment 14. The walls 23 and 23—a define an air duct opening covered with a grill 23—b in the forward end of the cab the duct terminating in fluid communication with the radiator 22 in the top of the engine compartment. The portion of the roof superjacent the engine is provided with a hatch 24 hinged at its forward end and adapted for retention in its open position by supporting arms 25 and 26. The said two compartments, namely the driving compartment and the engine compartment are sealed from one another by a wall 27 preferably composed of thermal and accoustical insulating materials. The engine 19 shown in the driving compartment 18 is of the multicylinder type and is mounted in a vertical position supported by arms covered by the flywheel housing 28 which are supported in turn by the frame 11. The arms are cushioned by rubber bushings 28—a mounted in the customary manner upon the frame bolts, as shown in Fig. 6. A transmission 29 supported on frame 11 is coupled with the said engine 19 through a suitable driving connection such as mitre gears 30 shown in Fig. 2.

Figure 3:
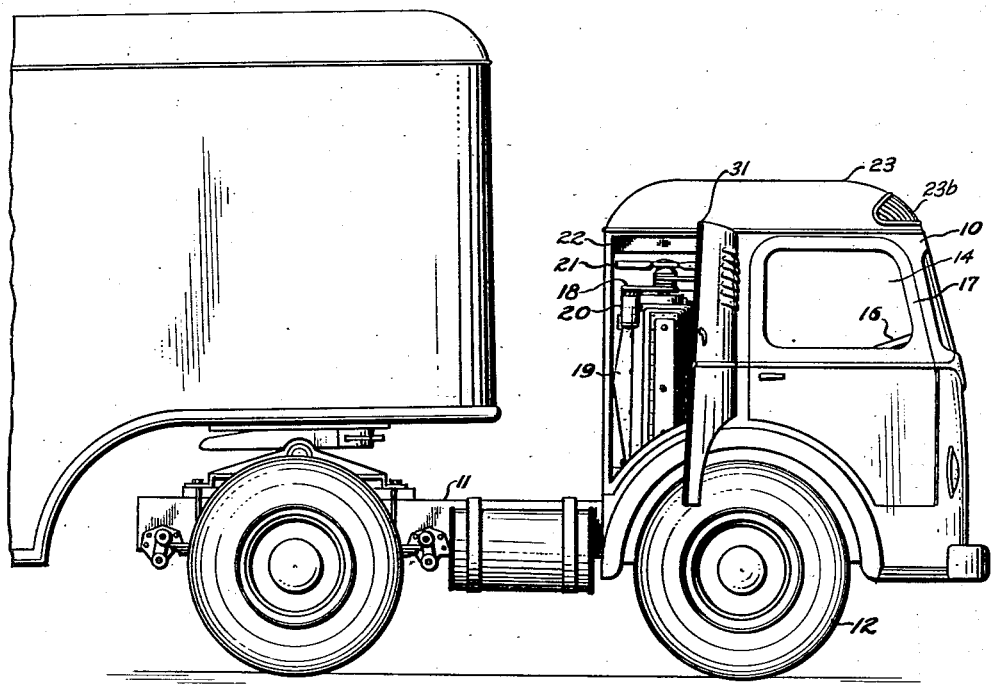
Fig. 3 is a right side elevation of the tractor-trailer combination showing the engine compartment door in its open position.
Figure 4:
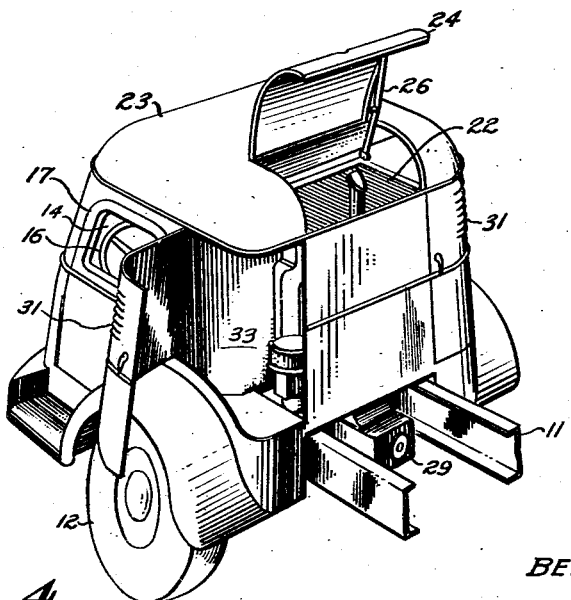
Fig. 4 is a perspective of the cab as viewed from the left rear corner thereof, showing the door of the compartment and the hatch in the roof in their open position.

The opposed sides of the engine compartment 18 are provided with hinged doors 31 having louvers 32 therein (Figs. 3, 5 and 6), the doors being constructed to expose the sides of the engine throughout its length for the purpose of inspection, maintenance and repair. In the preferred embodiment the engine is located within the engine compartment in such a manner that it may be withdrawn as a unit from the housing through the hatch 24 when a major overhaul or replacement is required.

Inasmuch as the engine and its accessories do not occupy the entire engine compartment the remaining space constituting lockers 33 and 34 may be used for the storage of tools, spare parts and similar accoutrements.

In the modified structure illustrated in Fig. 5, the engine fan 21 is mounted to effect the circulation of atmospheric air through the louvers 32 and the opening about the engine arms, through the radiator 22 and out through an opening covered by a grill 35 disposed in the rearward portion of the top of the cab.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. In a motor vehicle embodying a frame, a dropped front end section therein, road wheels mounted on said frame rearward said dropped end section, a cab mounted on said frame above said dropped end section, a vertical wall in said cab defining a driver's compartment and an engine compartment, an engine mounted on said frame within said engine compartment and with the major axis thereof disposed in vertical relation to the top of the frame, a top on said cab common to said driver's compartment and said engine compartment, a horizontal wall in said driver's compartment in juxtaposition with said top and defining a chamber in fluid communication with said engine compartment, doors in said cab for ingress and egress to said driver's compartment, said doors being disposed superjacent said dropped end section, doors in said cab for access to said engine, a door in said top for access to said engine, a radiator intermediate said chamber and said engine compartment the wall defining the top having an opening therein for the admission of air into said chamber, and means in said engine compartment to effect the circulation of air through said chamber, radiator and engine compartment.

2. In a motor vehicle embodying a frame, a cab mounted on the forward end thereof, a vertical partition therein defining a driver's compartment and a motor compartment, a roof on said cab having an opening in the forward end thereof, a horizontal partition in the driver's compartment parallel said roof and in contiguous relation therewith, a radiator in said motor compartment parallel said horizontal partition, an engine in said motor compartment disposed with the major axis thereof normal to the horizontal plane of the radiator, a fan intermediate said engine and said radiator for circulating air over the top of said driver's compartment and through said motor compartment and doors in said motor compartment for access to the opposed sides of said engine.

3. In a motor vehicle embodying a frame, road wheels mounted thereon, a cab mounted on said frame above the front road wheels, a vertical partition in said cab defining a driver's compartment and a motor compartment, a roof on said cab having an opening in the forward end thereof, a horizontal partition adjacent the top of said driver's compartment parallel said roof and in spaced relation therewith, the walls defining the engine compartment, also defining an opening in the bottom thereof, an engine in the top of said motor compartment arranged with the major axis thereof normal to said roof, a radiator in said motor compartment, a fan adjacent said radiator and parallel therewith for circulating air over the top of said driver's compartment and through said motor compartment and a hatch in said roof adjacent said radiator for access thereto.

4. In a motor vehicle embodying a frame, a dropped front end section thereon, front road wheels mounted on said frame adjacent the forward end thereof, a truck cab mounted on said frame above said wheels, a vertical partition in said cab defining a driver's compartment and a motor compartment, side doors in said driver's compartment forwardly of the centers of said wheels, side doors in said motor compartment rearwardly of the centers of said wheels, a roof on said cab having an opening in the forward end thereof, a horizontal partition adjacent the top of said driver's compartment and parallel to said roof, a radiator adjacent the top of said motor compartment and parallel to said roof, a fan subjacent said radiator for circulating air over the top of said driver's compartment and through said motor compartment, the walls defining said motor compartment also defining an opening in the bottom thereof, a multi-cylinder engine in said motor compartment, a fly wheel housing on said engine, said engine being disposed in said motor compartment with the major axis thereof disposed in normal relation to said radiator and with said fly wheel housing adjacent the opening in the bottom of said motor compartment.

5. In a motor vehicle embodying a frame, a dropped front end section thereon, front road wheels mounted on said frame adjacent the forward end thereof, a truck cab mounted on said frame above said wheels, a vertical partition in said cab defining a driver's compartment and a motor compartment, a roof on said cab having an opening in the forward end thereof, a horizontal partition in the top of said driver's compartment disposed in spaced relation with said roof, a radiator in the top of said motor compartment disposed in parallel spaced relation with said roof, an engine in said motor compartment arranged with the major axis thereof in a vertical position, and a fan on the top of said engine adjacent the bottom of said radiator for circulating air over the top of the driver's compartment and through said motor compartment.

6. In a motor truck embodying a frame, front road wheels and an engine supported thereon, a cab for said truck comprising a front wall disposed forwardly of said wheels and engine, a rear wall disposed rearwardly of said wheels and engine, side walls disposed intermediate said engine and the upper portions of said wheels, a cab top having an opening in the forward end thereof, a vertical partition in said cab parallel to said front wall defining a driver's compartment and an engine compartment, a horizontal partition in said driver's compartment adjacent said top and parallel thereto, and a radiator in said engine compartment parallel to said horizontal partition, the walls forming the engine compartment defining an opening in the base thereof, a fan adjacent the top of said motor compartment whereby air entering the opening in the forward end of the top will flow over the horizontal partition in the driver's compartment through said radiator, over the engine and out through said opening in the bottom of said engine compartment.

7. In a motor truck embodying a frame, front road wheels and an engine supported thereon, a cab for said truck comprising a front wall disposed forwardly of said wheels and engine, a rear wall disposed rearwardly of said wheels and engine, side walls disposed intermediate said engine and the upper portions of said wheels, a top supported on said walls, a vertical partition in said cab defining a driver's compartment and an engine compartment, a horizontal partition in said driver's compartment adjacent said top and parallel thereto, doors in said side walls for access to said driver's compartment, doors in said side walls for access to the engine in said engine compartment, a radiator in said engine compartment parallel to said horizontal partition, said top having an opening therein in atmospheric communication with said radiator and a fan in said engine compartment parallel to said radiator for forcing air therethrough.

BERT C. HARRIS.